United States Patent [19]

Shanks et al.

[11] 4,322,784
[45] Mar. 30, 1982

[54] VEHICLE HEADLAMP HAVING AN INTEGRALLY MOLDED TRIM REFERENCE PLANE

[75] Inventors: Bruce E. Shanks, Chesterland; Dan R. Campbell, South Euclid, both of Ohio

[73] Assignee: General Electric Company, Schenectady, N.Y.

[21] Appl. No.: 85,369

[22] Filed: Oct. 16, 1979

[51] Int. Cl.³ .............................................. F21V 7/00
[52] U.S. Cl. .................................................. 362/306
[58] Field of Search ................................ 362/226, 306

[56] References Cited
U.S. PATENT DOCUMENTS

| | | | |
|---|---|---|---|
| 2,261,508 | 11/1941 | Trippe | 362/226 |
| 3,732,415 | 5/1973 | Lindae | 362/226 |
| 4,198,027 | 4/1980 | Urbanek | 362/306 X |

FOREIGN PATENT DOCUMENTS 2280026  2/1976  France ................................. 362/306

Primary Examiner—Peter A. Nelson
Attorney, Agent, or Firm—Lawrence R. Kempton; Philip L. Schlamp

[57] ABSTRACT

This invention relates to polymer sealed beam headlamp units having trim rim reference planes integrally molded therewith. The headlamp includes a polymer envelope having a reference plane integrally molded with the reflector portion of the envelope which projects radially outward and forward therefrom for providing a precise reference plane forward of the lamp face.

10 Claims, 1 Drawing Figure

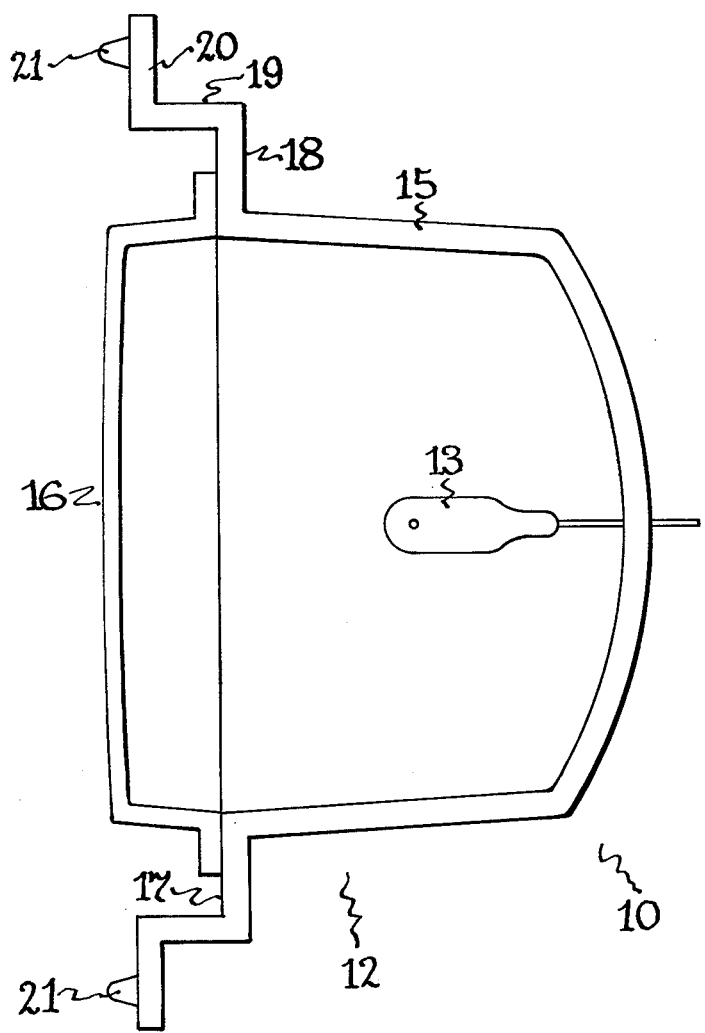

VEHICLE HEADLAMP HAVING AN INTEGRALLY MOLDED TRIM REFERENCE PLANE

This application relates to co-pending application Ser. Nos. 85,454; 85,354; 85,353; and now issued U.S. Pat. No. 4,210,841 assigned the assignee of the present invention the disclosures of which are incorporated herein by reference.

This invention relates to polymer sealed beam headlamp units having trim rim reference planes integrally molded therewith. The headlamp includes a polymer envelope having a reference plane integrally molded with the reflector portion of the envelope which projects radially outward and forward therefrom for providing a precise reference plane forward of the lamp face which is substantially perpendicular to the beam axis.

Sealed beam lamps are dependent on a forward reference plane established by ground face gizmoes for proper alignment of the lamp relative to a vehicle. The gizmoes are applied to the lamp face during manufacture and are subsequently ground such that the forward surfaces of the gizmoes define a plane which is perpendicular to the beam axis of the lamp. The beam axis is thus characterized by the reference plane. Ground lens gizmoes are a necessary component of all prior lamps because tolerances build up in the lamp envelope during manufacture and sealing of the lamp. No one surface is precisely referenced relative to another. The gizmoes are provided on the lens to compensate for the lamp manufacturing tolerances by providing an empirically established reference plane after the lamp has been manufactured.

The headlamp of the present invention provides a headlamp having a precise forward reference plane which is established during the manufacture of the lamp. The headlamp employs a polymer envelope construction in which a polymer lens is vibrationally or ultrasonicaly bonded to a polymer reflector. Polymer materials are not subject to the expansion and manufacturing tolerance of for instance pressed glass and polymer materials are inherently capable of more precise molding than for instance glass.

It is an object of this invention to utilize the inherent properties of polymer plastics to provide a precisely molded headlamp having a pre established reference plane integrally molded therein.

The headlamp of the present invention eliminates the need for empirically characterizing the lamp beam and according reduces labor and manufacturing costs.

The integral reference plane further eliminates the need for lens gizmoes and in a preferred embodiment provides a lamp which is prefocused and referentially characterized during manufacture.

The headlamp of the present invention further provides a decorative trim rim which decoratively interfaces a headlamp with a vehicle and eliminates the need for a separate decorative trim rim.

Additionally the trim rim provides a vibration damper between the vehicle and the headlamp which resiliently absorbs the vibrations inherent in operating vehicles.

The reference plane headlamp of the present invention comprises a sealed polymer envelope having reflector which is ultrasonically or vibrationally bonded to a light transmissive lens. A light source is sealed within the envelope and focused relative to the reflector portion thereof during its manufacture. A trim rim reference plane is molded integral with the envelope and more particularly is molded integral with the reflector portion of the envelope during the manufacture thereof. The trim rim is referentially related to the reflector and accordingly referentially related to the light source focused within the reflector. The rim has a forward reference surface which in a preferred embodiment is substantially planar. The reference plane projects outwardly from the envelope and forward of the lens to establish a forward surface which referentially characterizes the beam produced by the attached lamp. In a preferred embodiment the reference plane is substantially perpendicular to the axis of the beam.

These other objects and features and a more complete understanding of the aspects of this invention will be apparent from the following detailed description which taken in conjunction with the drawings represents a perferred embodiment of this invention.

DESCRIPTION OF THE DRAWING

FIGURE 1 is a cross sectional view of the reference plane headlamp of the present invention.

DETAILED DESCRIPTION

Referring now to FIGURE 1, the headlamp 10 of the present invention is shown in cross section. The headlamp generally comprises a sealed envelope 12 having a light source 13 sealed therein. The envelope 12 is sealed against the entrance of moisture or other contaminants which erode the filament and degrade the reflector. The light source 13 as shown can be enclosed within an inner bulb to further protect the filament from contamination. The envelope 12 generally comprises a reflector portion 15, having a reflective coating applied thereto, which is virbrationally or ultrasonically welded to a light transmissive lens 16. The light source 13 is focused relative to the reflector 15 during the manufacture of the envelope 12. The axis of the beam thus substantially coincides with the optical axis of the lamp 10.

A reference plane is integrally molded with the envelope 12 during the manufacture thereof as a trim rim 17. More particularly, the rim 17 is integrally molded with the reflector 15 of the envelope 12. The rim 17 is thus structurally referenced to the reflector 15 which directionally controls the light impinging upon it. The rim 17 projects outwardly from the lamp envelope 12 in definite and known relation. More particularly, the rim 17 includes a base section 18 which for instance, projects radially from the lamp envelope 12 in a plane substantially perpendicular to the axis of the lamp or in a plane tangent to a point in the center of the reflector 15, for instance the center of the parabolic portion of the reflector surface 15. The base portion 18 is followed by an intermediate portion 19 which for instance is at right angles with the base portion 18. The transition portion 19 is then followed by a reference plane or forward rim 20 which for instance is at a right angle with the transition portion 19 and parallel to the base portion 18. The surface of the forward rim 20 is thus referentially related to the focus of the lamp 10.

Although the rim 17 has been described in a preferred embodiment as a combination of mutually related planes, the rim 17 can have any of a number of configurations provided the forward rim 20 bears a know relation to the reflector 15. It is preferred that the forward rim 20 be substantially perpendicular to the axis of the beam in order that the rim 17 provides a known reference plane to the lamp 10. In an alternate embodiment, the rim 17 is provided with gizmoes 21 to referentially define the rim 17 regardless of the exterior configuration of the rim. In particular the rim 17 can have a grillwork like structure with gizmoes providing the planar reference. Te reference surface of the gizmoes are predefined and there is no need for them for be ground to reference the beam axis. Further the gizmoes are compatible with and readily adapt the reference plane of the lamp 10 to known lamp installation and alignment equipment.

It will be appreciated that the present invention provides a simple and economical assembly for mounting a lamp in a known and aimed relation with a vehicle forward structure. Although the present invention has been described with reference to a sealed beam lamp unit, it is readily apparent that the rim reference plane of the present invention may be used in combination with a variety of lamp units where a precise positioning is needed. In the particular vehicle structure environment of the present lamp assembly, the present rimmed referenced plane headlamp yields surprising advantages. The rimmed headlamp provides a quick and inexpensive means for referencing the beam axis forward of the lamp unit for aiming the lamp relative to a vehicle.

Although the invention has been described in its preferred form with a certain degree of particularity, it is understood that the present disclosure of the preferred embodiment is made by way of example and that various modifications in the details of construction may be resorted to without departing from the true spirit and scope of the invention. It is intended that the patent shall cover, by suitable expression in the appended claims whatever features of patentable novelty exist in the invention disclosed.

We claim:

1. A vehicle headlamp comprising a light source sealed within and focused relative to a sealed polymer envelope having a reflector portion and a light transmissive lens effective for producing a light beam having an axis substantially parallel to the optical axis of said headlamp, and an integral trim rim molded with and projecting radially outwardly from the exterior of said envelope, said rim having a forwardly facing surface predeterminedly positioned relative to said axis of said light beam and to said envelope and defining an accessible precisely located reference plane referentially characterizing said light beam and effective for use in predeterminedly aligning said light beam relative to the vehicle.

2. The vehicle headlamp of claim 1 wherein said reference plane extends substantially perpendicular to the axis of said light beam.

3. The vehicle headlamp of claim 1 wherein said rim is integral with the reflector portion of said envelope.

4. The vehicle headlamp of claim 1 wherein said forwardly facing surface of said rim is planar.

5. The vehicle headlamp of claim 1 or 7, wherein said rim is resilient and is effective for damping vibration of said headlamp.

6. The vehicle headlamp of claim 1 wherein said rim has a decorative face.

7. A vehicle headlamp comprising a sealed polymer envelope including a reflector portion and a light transmissive lens, a light source sealed within said envelope and predeterminedly positioned relative to said reflector portion thereof for producing a light beam having an axis substantially parallel to the optical axis of said headlamp, and a trim rim integral with said reflector portion of said envelope and comprising a base section extending radially outwardly from the exterior of said reflector portion, an intermediate section extending forwardly from said base section, and a forward rim section extending substantially radially outwardly from said intermediate section, said forward rim section having a forwardly facing surface predeterminedly positioned relative to said axis of said light beam and to said reflector and defining an accessible precisely located reference plane referentially characterizing said light beam and effective for use in predeterminedly aligning said light beam relative to the vehicle.

8. The vehicle headlamp according to claim 7, wherein said forwardly facing surface of said forward rim section is decorative.

9. The vehicle headlamp according to claim 7, wherein said forwardly facing surface is planar and extends perpendicular to said axis of said light beam.

10. The vehicle headlamp according to claim 7, wherein said forwardly facing surface includes a plurality of integrally spaced gizmoes defining an accessible reference plane extending perpendicular to said axis of said light beam.

* * * * *